(12) United States Patent
Thomure et al.

(10) Patent No.: US 6,430,864 B1
(45) Date of Patent: Aug. 13, 2002

(54) AUTOMATIC HOOK SET FISHING ROD HOLDER

(76) Inventors: Lee E. Thomure; Barbara L. McClain, both of 927 Warren St., Apt. A., St. Louis, MO (US) 63102-1535

( * ) Notice: Subject to any disclaimer, the term of this patent is extended or adjusted under 35 U.S.C. 154(b) by 0 days.

(21) Appl. No.: 09/681,292

(22) Filed: Mar. 14, 2001

(51) Int. Cl.[7] .............................................. A01K 97/11
(52) U.S. Cl. ........................................... 43/15; 43/21.2
(58) Field of Search ............................ 43/15, 16, 21.2; 248/514, 515, 518, 520, 523, 530, 534, 535, 538, 540

(56) References Cited

U.S. PATENT DOCUMENTS

| | | | | |
|---|---|---|---|---|
| 2,564,840 A | * | 8/1951 | Glenn | 43/15 |
| 2,592,306 A | * | 4/1952 | Maze | 43/514 |
| 2,661,563 A | * | 12/1953 | Adams, Jr. et al. | 43/16 |
| 2,781,600 A | * | 2/1957 | McDonnell | 43/15 |
| 2,828,096 A | * | 3/1958 | Beri | 43/21.2 |
| 2,835,065 A | | 5/1958 | Schwartzkopf | 43/15 |
| 2,902,237 A | * | 9/1959 | Carper | 43/518 |
| 2,944,361 A | * | 7/1960 | Coulter | 43/16 |
| 2,996,824 A | * | 8/1961 | Faycosh | 43/16 |
| 3,007,275 A | * | 11/1961 | Standley | 43/15 |
| 3,016,648 A | | 1/1962 | Ingersoll et al. | 43/15 |
| 3,037,314 A | * | 6/1962 | Hardy | 43/514 |
| 3,385,544 A | * | 5/1968 | Barnett | 43/538 |
| 3,412,499 A | * | 11/1968 | Pastrovich, Sr. | 43/15 |
| 3,456,377 A | * | 7/1969 | Niles | 43/15 |
| 3,672,085 A | * | 6/1972 | King | 43/15 |
| 3,691,665 A | * | 9/1972 | Niles | 43/15 |
| 3,777,389 A | | 12/1973 | DeMino | 43/15 |
| 3,832,794 A | * | 9/1974 | Encinias | 43/15 |
| 3,897,922 A | * | 8/1975 | Keen | 248/514 |
| 3,906,653 A | * | 9/1975 | Williams | 43/21.2 |
| 4,012,861 A | | 3/1977 | Gellatly | 43/15 |
| 4,031,651 A | * | 6/1977 | Titze | 43/15 |
| 4,235,035 A | | 11/1980 | Guthrie | 43/15 |
| 4,397,113 A | | 8/1983 | Pinson | 43/15 |
| 4,476,645 A | * | 10/1984 | Paarmann | 43/15 |
| 4,486,968 A | | 12/1984 | Gould | 43/15 |
| 4,573,281 A | * | 3/1986 | Moisan | 43/17 |
| 4,841,660 A | * | 6/1989 | James | 43/21.2 |
| 5,279,064 A | | 1/1994 | Jaeger | 43/15 |
| 5,359,802 A | | 11/1994 | Gutierrez | 43/16 |
| 5,524,376 A | | 6/1996 | Flisak | 43/15 |
| 5,533,294 A | | 7/1996 | Coulter | 43/15 |
| 6,088,946 A | | 7/2000 | Simmons | 43/15 |
| 6,125,570 A | | 10/2000 | Valrey, Sr. | 43/15 |

FOREIGN PATENT DOCUMENTS

FR          2602646 B1   *   2/1988

* cited by examiner

*Primary Examiner*—Darren W. Ark
(74) *Attorney, Agent, or Firm*—Polster, Lieder, Woodruff & Lucchesi, L.C.

(57) ABSTRACT

A fishing rod holder with a unique, adjustably tension-biased, automatic triggering mechanism that allows the user to place the holder in the ground and in a cocked position, cast a line into a body of water and then place the rod in the holder, such that when a fish tugs on a hook on the line, the tug actuates the triggering mechanism to cause the holder to snap the top of the rod away from the tug to automatically set the hook in the mouth of the fish. The holder can also be configured with a permanently affixed or removable clamp to fasten the holder to a variety of mounting surfaces.

23 Claims, 4 Drawing Sheets

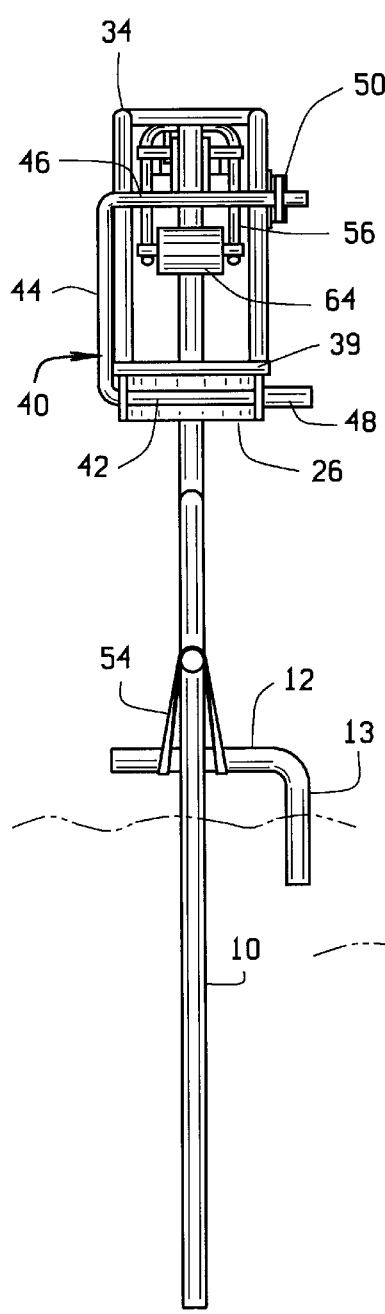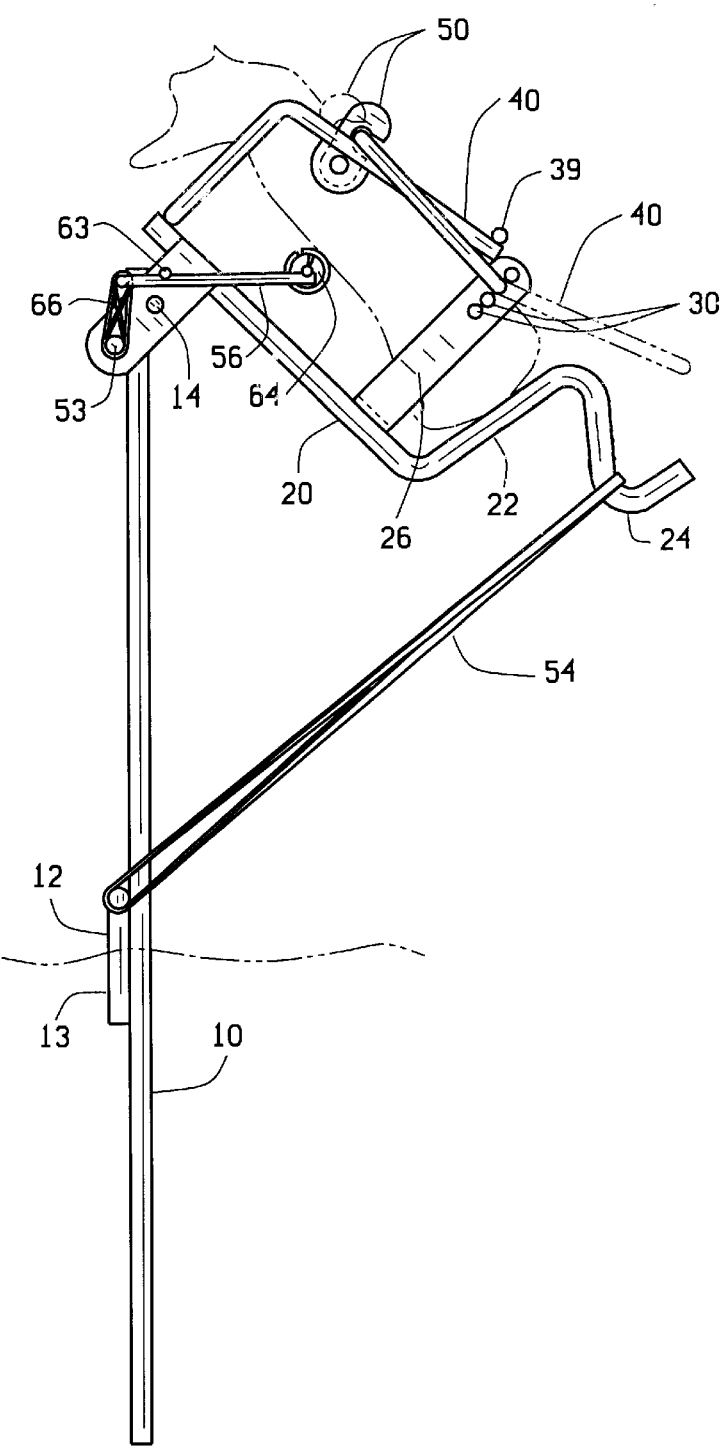
FIG. 3
FIG. 4

AUTOMATIC HOOK SET FISHING ROD HOLDER

BACKGROUND OF INVENTION

The present invention relates to an apparatus for hooking a fish automatically, and more particularly, to an apparatus that can be set in the ground or clamped to a mounting surface, for holding a fishing rod that has already been cast and automatically pulling back on the rod upon a strike by a fish in order to hook the fish.

Fishing rod holding devices and apparatuses are known in the prior art, and a multitude of various configurations have been documented. Each of the prior art configurations evidence operating and functional features that vary across a wide range of more familiar and less familiar mechanisms with a similar variety of purposes and objectives.

Some of these devices have been patented, such as U.S. Pat. Nos. 2,835,065, 3,016,648, 3,777,389, 4,012,861, 4,235,035, 4,397,113, 4,486,968, 5,279,064, 5,359,802, 5,524,376, 5,533,294, 6,088,946, and 6,125,570.

However, the prior art devices suffer because they are technically complex, too subtle and unreliable in application, and/or because they are not readily adjustable to accommodate different fishing rods, types of fish and fishing conditions. Those with more complex designs require more costly manufacturing. While each of these patented devices may fulfill their respective objectives, it would be desirable to provide an easy to use and appropriately sized rod holder that includes a simple and elegant triggering mechanism, and is easily adjustable to accommodate a wide variety of different sized handles.

SUMMARY OF INVENTION

The present invention resides in a fishing rod holder that is set in the ground, such that a fishing rod can be cast into a body of water and the lower end of the rod easily placed in a tension-biased cage on the holder that has been cocked away from the holder's support stake in such a manner that the rod rests against a trigger in the cage and the top of the rod is directed toward the body of water. When a fish tugs on a hook on the line, the tug pulls the rod against the trigger, releasing the cage from its cocked position to rapidly swing the lower end of the rod toward the holder's support stake and simultaneously snap the top of the rod away from the tug and thereby automatically set the hook in the mouth of the fish. This relieves the user of the necessity of holding the fishing rod at all times that the line is cast.

More particularly, the holder incorporates a unique triggering mechanism that engages the top of the holder's support stake and is tension-biased to release within a predetermined range of force. The trigger bias can be selectively adjusted for different rods, fish types and fishing conditions. Similarly, the tension bias that snaps the rod against the support stake can likewise be selectively adjusted for different rods, fish types and fishing conditions. Because the tension bias on the trigger and the tension bias on the cage are both applied with readily accessible rubber bands or springs, adjusting either tension bias is a simple matter of replacing the rubber bands or springs with different sizes or quantities.

Further, the present invention is comprised of simple, readily manufactured parts to enable low cost manufacture. The holder can also be configured with a permanently affixed or removable clamp to fasten the holder to a variety of mounting surfaces.

Of course, the present invention is readily adaptable to numerous shapes and sizes, and may be constructed of many materials, such as wood, plastics and metals.

Additional features of the present invention will be in part apparent and in part pointed out hereinafter.

BRIEF DESCRIPTION OF DRAWINGS

FIG. 3 is a front elevation of the rod holder of FIG. 1, embedded in the ground, with the cage in the relaxed position and the gate closed and locked against the cage by the latch;

FIG. 4 is a side elevation of the rod holder of FIG. 1 embedded in the ground, with the cage in the cocked position away from the support stake, with the gate closed and locked against the cage by the latch, and with a phantom view of a fishing rod located in the cage, and a phantom view of the gate open.

Corresponding reference characters indicate corresponding parts throughout the several views of the drawings.

DETAILED DESCRIPTION

Figures 1, 2:
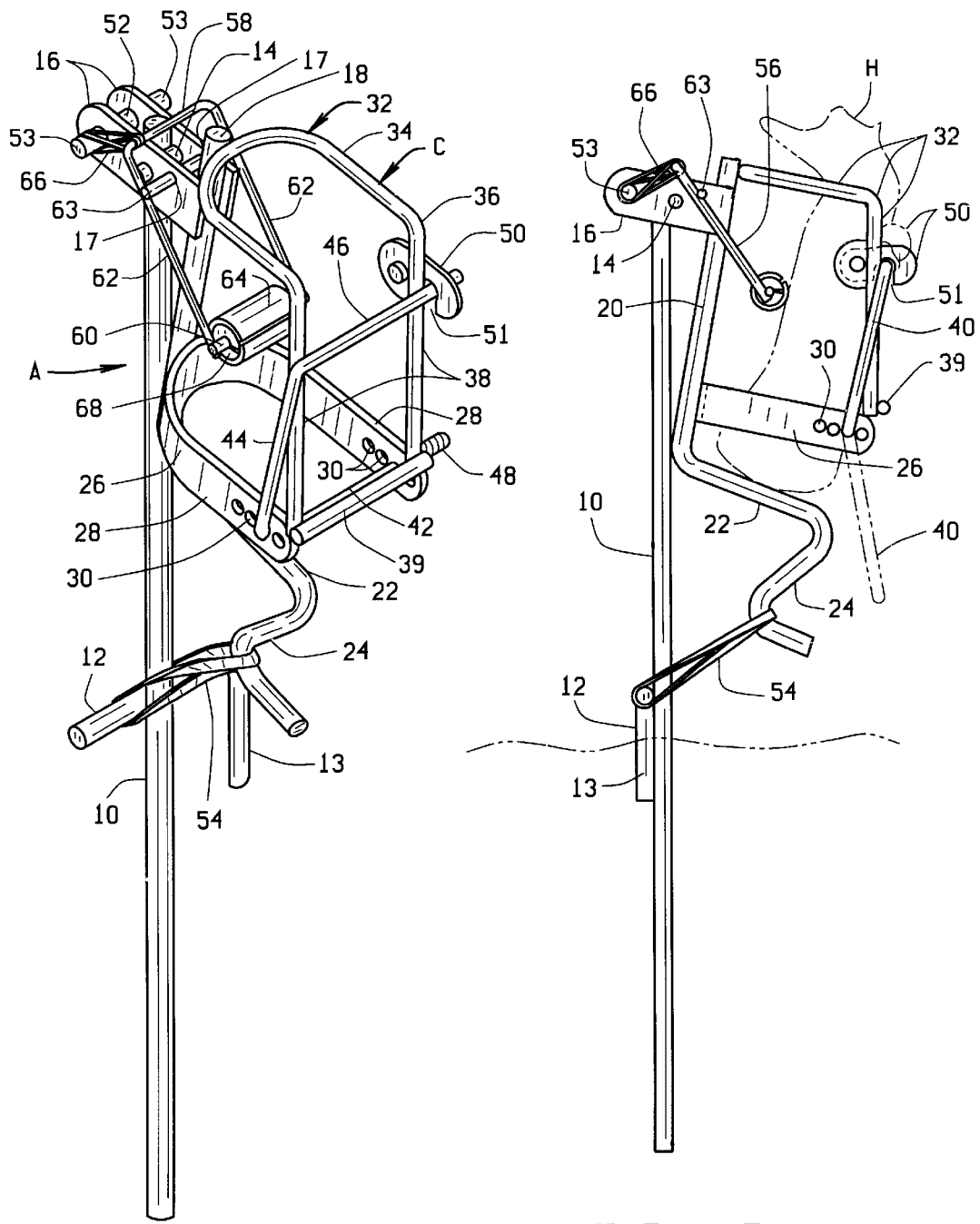
FIG. 1 is a perspective view of the preferred embodiment of the novel rod holder with the cage in the relaxed position against the support stake.
FIG. 2 is a side elevation of the rod holder of FIG. 1 embedded in the ground, with the cage in the relaxed position against the support stake, with the gate closed and locked against the cage by the latch, and with a phantom view of a fishing rod located in the cage, and a phantom view of the gate open.

The preferred embodiment of the novel automatic hook set fishing rod holder is indicated generally at A (FIGS. 1, 2). The rod holder A includes a support stake 10, a cross-member 12 attached to the stake 10, a pin 14 attached to the stake 10 near the top of the stake 10, and a rod handle cage C. The top of the cage C fixedly attaches to one end of a pair of pivot arms 16, and the pivot arms 16 rotatably attach to the pin 14 near the top of the stake 10. A clamp 70 (FIGS. 5, 6) can be provided to mount the holder A to a suitable mounting surface, such as a table, a chair, a seat or bench, or a boat gunwale.

The cage C includes a spine 18, a U-shaped stirrup 26, a frame 32, a brace 39, a gate 40, and a slotted latch 50 (FIG. 2). The spine 18 is formed into three portions, a back 20, a foot 22 and a hooked handle 24. The back 20 is straight and forms one vertical side of the cage C, while the foot 22 runs at a generally right angle to the back 20 and forms the floor of the cage C. The hooked handle 24 descends from the end of the foot 22. The top of the back 20 is attached to the top end of the frame 32 and to the proximal ends of the pivot arms 16 extending from the cage C.

The frame 32 includes a generally U-shaped top portion 34 (FIG. 1) which extends perpendicularly away from the spine back 20 to a bend 36, where the frame 32 turns and frame sides 38 descend toward the spine foot 22. The brace 39 spans between and attaches to the lower portion of the frame sides 38. The bottom end of each of the frame sides 38 attaches to one of the legs 28 of the stirrup 26. The U-shaped stirrup 26, in turn, attaches at its midpoint to the lower end of the spine back 20 above the junction between the back 20 and the foot 22.

A series of holes 30 are formed in each end of the stirrup 26. The gate 40 is generally C-shaped and includes a base 42, a vertical leg 44 and a top 46. The base 42 is directed through a pair of the holes 30, in each of which the gate 40 can freely rotate. The holes 30 are sized to accommodate the base 42 of the gate 40, and each of the holes 30 is paired to and aligned with, a corresponding hole in the opposite leg 28 of the stirrup 26. A plastic or rubber cap 48 fits snugly over the end of the gate base 42 to secure the gate 40 in the holes 30. The opposite or top end 46 of the gate 40 can be rotated such that it rests against both sides of the frame 32 below the bend 36, where the gate 40 can be held in place by the latch 50. As can be seen in FIG. 1, the latch 50 is rotatably attached at one end to one side of the frame 32 near where the gate 40 meets the frame 32. The other end of the latch 50 has a slot 51 sized to accommodate the upper end of the gate 40. When the gate 40 is positioned at or near the frame 32, the latch 50 can be rotated such that the slot 51 engages the gate 40 to secure the gate 40 in place.

A pair of pivot arms 16 are fixedly attached to opposite sides of the spine back 20, near the upper end of the spine back 20, and extend perpendicularly away from the cage C. The pivot arms 16 are pivotally attached near their midsections to the pin 14. The pin 14, in turn, is attached to the stake 10, near the upper end of the stake 10, such that the cage C is able to rotate about the pin 14 on the pivot arms 16. A second pin 52 spans between, and extends a short distance beyond, each of the distal ends of the pivot arms 16, such that a pair of nubs 53 protrude from the sides of the pivot arms 16.

A rubber band 54 is attached at one end to the spine handle 24, and attached at the other end to the cross-member 12, such that the rubber band is always in slight tension. Hence, the rubber band 54 tends to pull the cage C toward the stake 10. The cage C assumes its relaxed position when the cage C is rotated downward and the rubber band 54 holds the spine back 20 against the stake 10.

The trigger 56 is a rectangular hoop having a top crossbar 58, a bottom crossbar 60 located within the cage C, a pair of legs 62 extending between the top and bottom crossbars 58 and 60, and a pivot pin 63 that spans between and is attached to the midsection of the each of the legs 62. A plastic sleeve 64 is rotatably mounted to the bottom crossbar 60. The trigger pivot pin 63 fits through a pair of holes 17 in the pivot arms 16, such that the trigger 56 is free to rotate about the axis of the pin 63 in the holes 17, and the bottom crossbar 60 crosses through the cage C and the top crossbar 58 encircles the top side of the pivot arms 16. Further, the trigger 56 is positioned so that its top crossbar 58 slips over the top of the stake 10 when the cage C rotates about the pin 14 near the top of the stake 10 to its cocked position. The trigger 56 is also sized so that the sleeve 64 is positioned within the cage C to engage the midsection of a rod handle between the sleeve 64 and the gate top 46, as seen in FIG. 2, when the trigger top crossbar 58 is engaged with the top of the stake 10 and the gate 40 is locked in place by the latch 50.

A second, smaller rubber band 66 spans between the trigger top crossbar 58 and one of the nubs 53 at the distal ends of the pivot arms 16, such that one end of the rubber band 66 is looped over the nub 53, the midsection is wrapped around the trigger top crossbar 58, and the other end is then also looped over the nub 53. The rubber band 66 is thereby doubled-over and normally in slight tension. However, as the cage C pivots upward about the pin 14 and the trigger top crossbar 58 begins to slide across the top of the stake 10, the rubber band 66 begins to stretch further and the tension exerted on the trigger top crossbar 58 increases. (See FIG. 4). When the trigger top crossbar 58 crosses the top of the stake 10, the tension in the rubber band 66 snaps the trigger top crossbar 58 down against the side of the stake 10 opposite the cage C, thereby rotating the trigger bottom crossbar 60 and the sleeve 64 upwardly to hold the trigger 56 and the cage C in a cocked position. In this way, the trigger 56 can be automatically cocked. The trigger 56, and hence the cage C, are then held in the cocked position by engagement of the trigger top crossbar 58 with the top of the stake 10. Additionally, when the cage C is rotated upward about the pin 14, past the point of rotation where the trigger 56 moves into the cocked position, the pin 52 butts against the side of the stake 10 opposite the cage C, thereby limiting further rotation of the cage C about the pin 14.

The spine back 20 and foot 22, the cage frame 32, the brace 39 and the stirrup 26, form the fixed confines of the cage C. As can be seen in FIG. 2, when the upper end of the gate 40 is rotated away from the frame 32, a handle H of a fishing rod can readily be placed in or easily removed from the cage C. The lower end of the handle H fits within the framework formed by the stirrup 26, the brace 39 and the lower end of the gate 40. In order to accommodate different sizes and shapes of rod handles, the lower end of the gate 40 can be placed in different pairs of the holes 30. The butt end of the handle H rests on the top of the spine foot 22, and the side of the handle H rests against the trigger sleeve 64. The top 46 of the gate 40 is then rotated upward toward the frame 32, and the latch 50 is rotated to engage the gate 40 to lock the handle H in the cage C. Thus, the handle H is sandwiched between the trigger sleeve 64 and the gate top bar 46.

The sleeve 64 is adjustable and comprised of one or more tubular plastic sheets 68 (FIG. 1). The plastic sheets 68 can be readily removed or layered to optionally decrease or increase the diameter of the sleeve 64 to accommodate rod handles of different sizes and shapes. Although preferably made of plastic, the sleeve sheets 68 can be made from most any material which can be flexed to allow for removal or addition of the sleeves sheets 68 to and from the trigger bottom crossbar 60. Of course, the trigger 56 can also be configured to disassemble to allow for the use of additional material types for the sleeve sheets 68 that are not so flexible or pliant.

When a fish tugs on the fishing line attached to the fishing rod in the cage C, the tug is translated through the rod to the handle H, where the tug will exert a downward force on the sleeve 64 to pull the sleeve 64, and hence the trigger bottom crossbar 60, toward the cage spine back 20. The downward force causes the trigger bottom crossbar 60 to rotate about the pivot pin 63 in the pivot arms 16 toward the stake 10, and the trigger top crossbar 58 to rotate away from the stake 10. As the force is applied to the sleeve 64, and the trigger 56 begins to rotate about the pivot pin 63, the sleeve 64 rolls along the length of the handle H of the rod to minimize the likelihood of erratic trigger movements.

If the downward force caused by the tug on the fishing line is of sufficient magnitude to overcome the engagement between the trigger top crossbar 58 and the top of the stake 10, the trigger top crossbar 58 will rotate over the top of the stake 10, and the tension caused by the rubber band 54 pulling on the spine handle 24 will snap the cage C down in an arc against the side of the stake 10. This, in turn, snaps the top of the fishing rod up and away from the direction of the tug, pulling the fishing line and hook away from the fish, thereby automatically setting the hook in the fish that was tugging on the line.

Of course, different fishing rods, fish types and fishing conditions may demand different tension bias to the trigger 56 and the cage C. As one skilled in the art will quickly recognize, the tension biases to the trigger 56 or the cage C are readily adjustable by merely replacing the rubber bands 66 or 54, respectively, on the holder A with one or more rubber bands or springs that apply a different amount of tension. A calibrated set of rubber bands and/or springs can be readily identified and utilized on the holder A. The rubber bands 66 or 54 can even be wrapped in different configurations to adjust the tension bias; e.g. the rubber band 66 can be doubled-over more than once between the trigger 56 and the pivot arms 16 to adjust the tension on the trigger 56.

Figure 5:
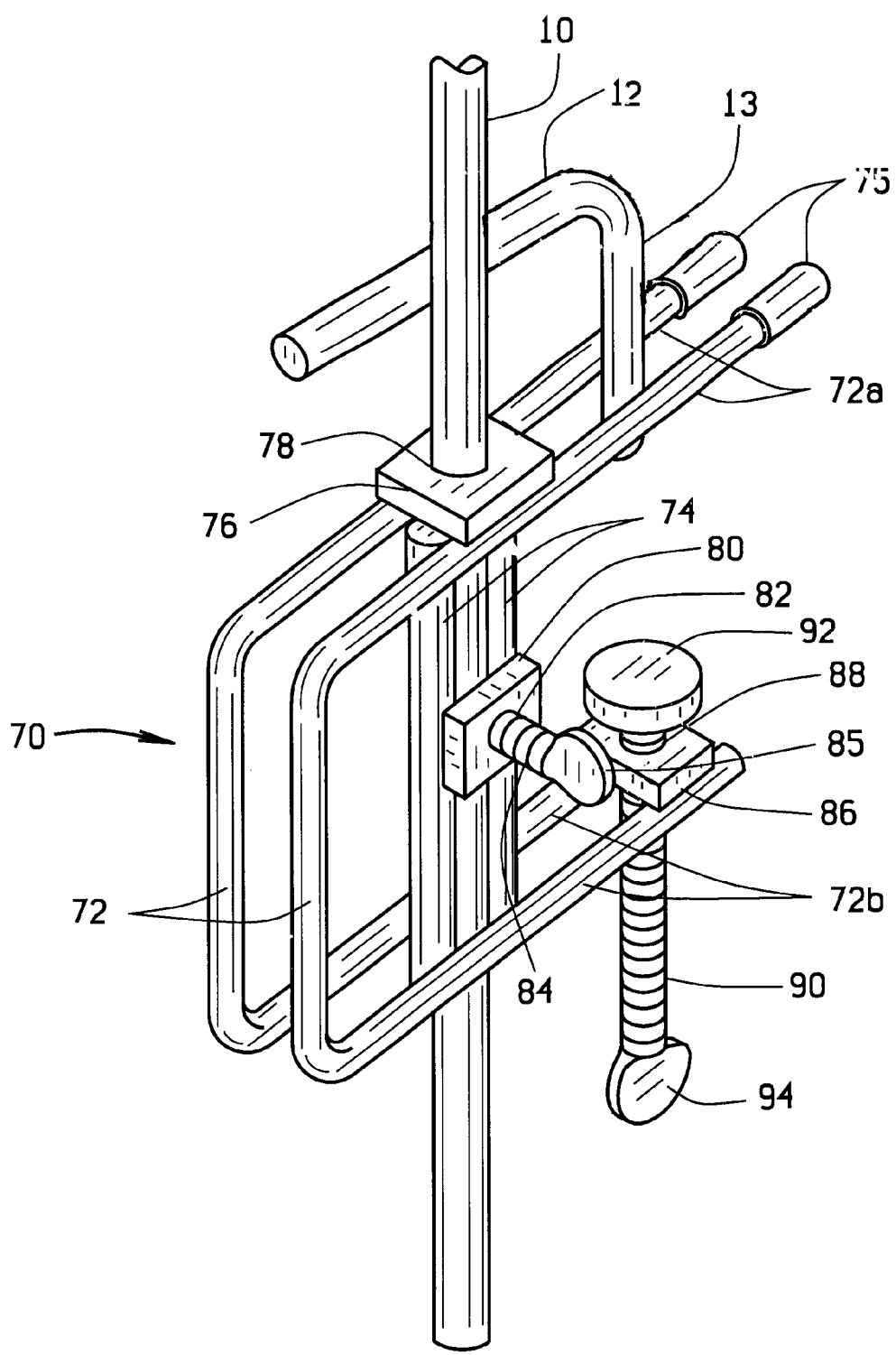
FIG. 5 is a perspective view of a clamp for the rod holder, showing the lower portion of the rod holder stake in the clamp.
Figure 6:
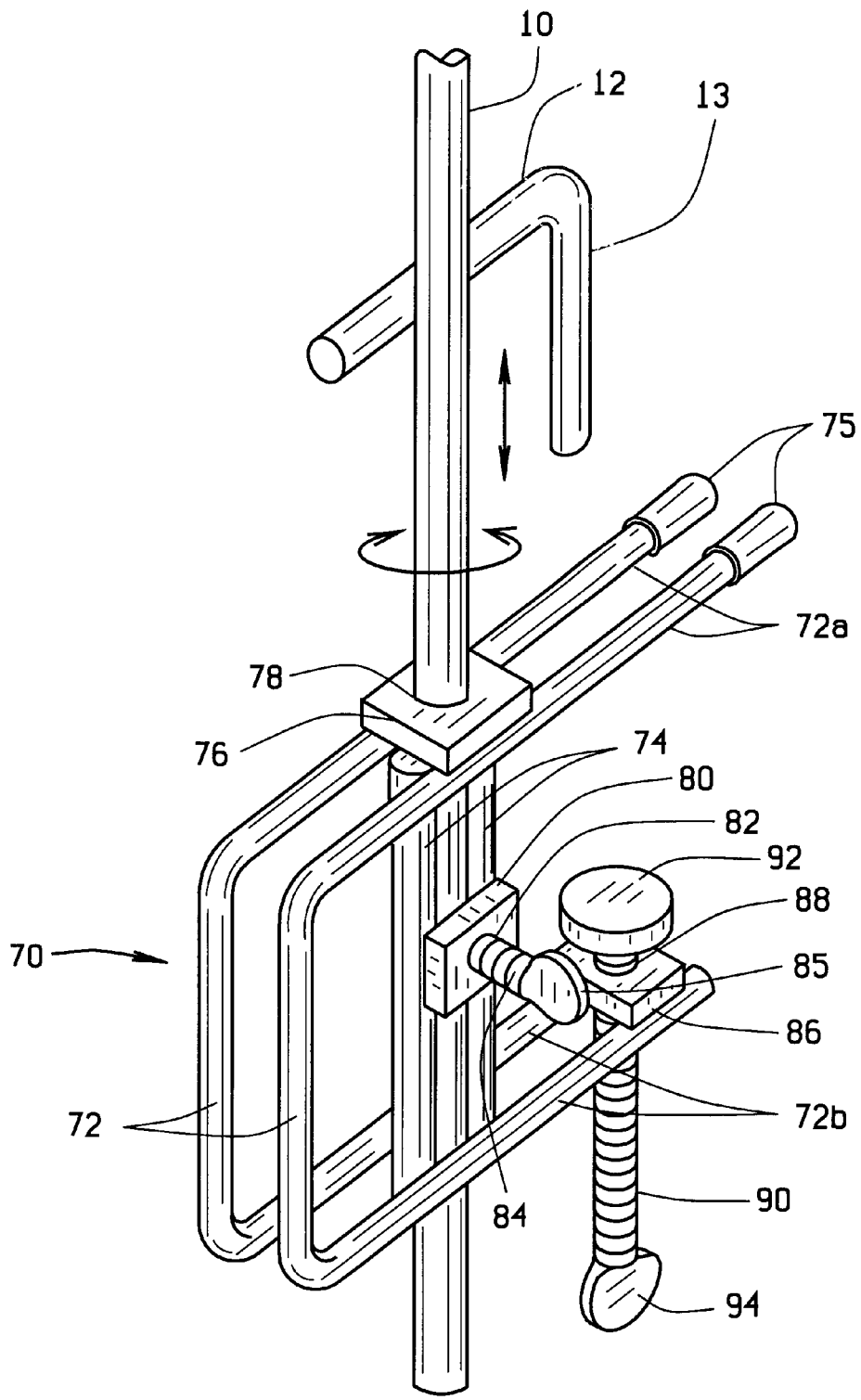
FIG. 6 is a perspective view of the clamp for the rod holder, showing the lower portion of the rod holder stake in the clamp, with directional arrows drawn along and about the stake to indicate the rotational and elevational mobility of the rod holder within the clamp.

As an additional feature, the present invention also incorporates a separable clamp 70 that can readily be attached to the lower end of the stake 10. (FIG. 5). In the preferred embodiment, the clamp 70 is formed from a set of parallel rods 72 that wrap around a second pair of parallel vertical rods 74. The rods 72 are spaced apart from one another a distance slightly greater than the diameter of the stake 10, and form three sides of a rectangle, having upper rungs 72a and lower rungs 72b. The ends of the rods 72 along the upper rungs 72a are each covered with caps 75. The fourth side of the rectangle formed by the rods 72 comprises the open end of the clamp 70. The vertical rods 74 are likewise spaced apart from one another a distance slightly greater than the diameter of the stake 10. The rods 74 bisect, and run parallel to the open side of, the rectangle formed by the rods 72. Each end of both of the rods 74 are rigidly attached to the rods 72.

A top plate 76 spans across and is rigidly attached to the top of the rods 72 directly above the top ends of the rods 74. A hole 78, having a diameter slightly greater than the diameter of the stake 10, runs through the center of the plate 76. The hole 78 is aligned with the rods 74 such that the stake 10 can simultaneously fit through the hole 78 and between the rods 74. A stake plate 80 spans across and is rigidly attached to one side of the rods 74. A hole 82, threaded to accept a bolt 84, runs through the center of the plate 80. When the clamp 70 and the rod holder A are properly conjoined, the stake 10 is placed through the top plate hole 78 and between the rods 74. The bolt 84 is then placed in the stake plate hole 82 and tightened against the stake 10 to fasten the rod holder stake 10 to the clamp 70. The bolt 84 has a flat end 85 which can be easily gripped to adjust the bolt 84 by hand. Because the stake 10 is free to rotate about its own axis in the clamp 70 until the bolt 84 is tightened on the stake 10 (See FIG. 6), the rod holder A can be secured in any rotational orientation within the clamp 70. The rod holder A can also be secured in the clamp 70 at different vertical positions within in the clamp 70, so long as the bolt 84 is able to tighten on a portion of the stake 10. Further, the clamp 70 is designed to simultaneously accept the descending leg 13 of the cross-member 12 along with the stake 10 to provide additional stability and further limit the potential for rotation of the rod holder A in the clamp 70 during operation. Of course, the clamp 70 can also accommodate any rod holder other than the rod holder A, so long as the central stake is sized to fit within the clamp 70.

A third plate 86 spans across and is rigidly attached to the top side of the bottom rungs 72b of the rods 72 near the open side of the rectangle formed by the rods 72. A hole 88, threaded to accept a bolt 90, runs through the center of the plate 86. The bolt 90 has a floating head 92 and a flat end 94 that can be turned by hand. The bolt 90 is long enough to be tightened against the bottom side of the mounting surface located between the upper rungs 72a and the lower rungs 72b. The head 92 and end 94 maintain the bolt 90 in the hole 88 of the plate 86.

When it is desired to hold the rod holder A fast to a mounting surface, such as on a table, chair, bench or boat rail, the rod holder A and the clamp 70 are united by placing the stake 10 of the rod holder A through the hole 78 and between the rods 74, and tightening the bolt 84 against the stake 10. Additionally, the leg 13 of the cross-member 12 can be received between the clamp upper rungs 72a to further prevent rotation of the holder A relative to the clamp 70. The bolt 90 should be unscrewed to provide sufficient clearance for the desired mounting surface to fit between the head 92 of the bolt 90 and the bottom surfaces of the upper rungs 72a. The clamp 70 is then positioned on the mounting surface such that the one end of the mounting surface fits between the head 92 of the bolt 90 and the bottom of the upper rungs 72a. The bolt 90 tightened to clamp the clamp 70 to the mounting surface.

Of course, the clamp 70 can be clamped to the mounting surface first, and the rod holder A can thereafter be united with the clamp 70. In addition, the rod holder A may be separated from the clamp 70 at any time by merely loosening the bolt 84 and sliding the stake 10 up and out of the center of the clamp 70. In this way, the clamp 70 can remain clamped to a desired mounting surface while the rod holder A can be used elsewhere. Furthermore, the clamp 70 may be clamped on virtually any mounting surface that fits between the upper rungs 72a and the top of the head 92 of the bolt 90.

The present invention, therefore, enables the user to cast a fishing line into a body of water and set the rod in the rod holder A. When the rod holder A is then cocked, the user can perform other activities while still fishing. A tug on the fishing line will cause the rod holder A to automatically hook the fish for the user. The user can then remove the rod from the rod holder A at the user's leisure and reel the fish in. In addition, not only can the rod holder A be set in the ground on its own, the user can easily, controllably, and rapidly clamp the rod holder A to a fixed mounting surface and just as easily remove the rod holder A from the mounting surface.

Because the design of the present invention is uncomplicated and elegant, it is simple to use, reliable and easy to maintain. In addition, all of the parts for the device are easy to manufacture, require no special machines or tooling, and should result in a reasonably low cost to produce.

Other variations on the basic apparatus are also available. For example, the entire rod holder A and the clamp 70 can be made in a variety of sizes for different fishing applications. Similarly, the cage C can independently be made in a variety of sizes for different rod shapes and sizes. By incorporating a removable pin or other such device at the pin 14, the cage C can readily be designed to be removed and interchanged with different cages. Each of the various members of the cage C, such as the frame 32 and the stirrup 26, can also be reshaped and resized. Similarly, the clamp rods 72 can be formed into a variety of shapes, so long as they construct an opening along one side for the clamp to fit over the desired mounting surface. Further, the clamp plate 80 and bolt 84 can be attached to either side of the clamp rods 74. Likewise, the plate 86 and bolt 90 can be located along the upper rungs 72a instead of the lower rungs 72b.

A variety of different restraining or locking devices, such as clasps, magnets or clamps, can be used in place of the latch 50. Similarly, other elastic devices, such as springs, may be used instead of the rubber bands 54 and 66. Additionally, the rubber band 66 may be omitted to allow for manual setting of the trigger. The cross-member 12 may be formed in a variety of shapes, such as loops, diagonals and a fork, so long as at least part of the cross-member 12 can be directed into the ground. In addition, the rods may all be formed in numerous cross-sectional shapes, such as rectangles, squares and octagons. Similarly, the bolts 84 and 90 can be replaced with a variety of other fastening devices such as screws, ratchets and clamps. Finally, each of the components of the invention can be manufactured from a variety of materials, including, but not limited to, plastics, metals and woods, so long as the apparatus maintains the same functionality and the necessary structural integrity.

As various changes could be made in the above constructions without departing from the scope of the invention, it is intended that all matter contained in the above description or shown in the accompanying drawings shall be interpreted as illustrative and not in a limiting sense.

What is claimed is:

1. In an automatic fishhook setting fishing rod holder, the holder comprising a stake, and a spine operatively mounted to said stake at a first point and movable between a cocked position and a relaxed position, the spine being adapted to removably receive a lower end of a fishing rod; wherein the improvement comprises an automatic triggering device comprising:
    a. a pivot arm having a first end and a second end, the pivot arm being attached along the first end to the spine and pivotally mounted between its first and second ends to an upper end of the stake;
    b. a trigger pivotally mounted to the pivot arm and movable between a relaxed and a cocked position; the trigger including an upper crossbar and a lower crossbar; the trigger lower crossbar being in proximity to the spine, and capable of engaging the lower end of the fishing rod when the rod is received by the spine; and
    c. an elastic member extending between the second end of the pivot arm and the trigger to apply a tension bias to the trigger when the trigger is cocked; the pivot arm being of such a length, and the trigger being of such a length and being positioned on the pivot arm such that as the spine is moved between its relaxed and cocked positions, the trigger upper crossbar will automatically engage the stake to hold the trigger and the spine in their cocked positions.

2. In the automatic fishhook setting fishing rod holder of claim 1, wherein the elastic member is a first elastic member, the automatic triggering device further comprising a second elastic member extending between the spine and a second point on the stake, the second elastic member being positioned such that tension on the second elastic member increases as the spine is moved from its relaxed position to it cocked position.

3. A fishing rod holder for automatically hooking a fish on a fishing line comprising:
    a. a stake;
    b. a spine operatively mounted to said stake at a first point and movable between a cocked position and a relaxed position, the spine being adapted to removably receive the lower end of a fishing rod;
    c. an elastic member extending between the spine and a second point on the stake, the elastic member being positioned such that tension on the elastic member increases as the spine is moved from its relaxed position to its cocked position;
    d. a pivot arm, having a first end and a second end, the pivot arm being attached along its first end to the spine and pivotally mounted between its first and second ends near an upper end of the stake; and
    e. a trigger, pivotally mounted to the pivot arm, and movable between a relaxed and a cocked position; the trigger including an upper crossbar and a lower crossbar; the trigger lower crossbar being in proximity to the spine, and capable of engaging the lower end of the fishing rod when the rod is received by the spine; the trigger being positioned on the holder such that as the trigger is moved between its relaxed and cocked positions, the trigger upper crossbar will engage the stake to hold the trigger and the spine in their cocked positions;

wherein movement of the trigger lower crossbar caused by a tug on the fishing rod will cause the trigger upper crossbar to disengage the stake, thereby moving the trigger from its cocked to its relaxed position, and allowing the elastic member to pull the spine from its cocked position to its relaxed position.

4. The fishing rod holder as in claim 3, wherein the trigger is pivotal and the trigger upper crossbar will move in an arc over the stake to engage the stake.

5. The fishing rod holder as in claim 3, wherein the trigger upper crossbar engages the top of the stake.

6. The fishing rod holder as in claim 3, wherein the elastic member is a first elastic member, the fishing rod holder further comprising a second elastic member attached to the trigger to apply a tension bias to the trigger to secure the trigger's engagement with the stake.

7. A fishing rod holder for automatically hooking a fish on a fishing line comprising:
    a. a stake;
    b. a spine operatively mounted to said stake at a first point and movable between a cocked position and a relaxed position, the spine being adapted to removably receive the lower end of a fishing rod;
    c. a first elastic member extending between the spine and a second point on the stake, the elastic member being positioned such that tension on the elastic member increases as the spine is moved from its relaxed position to its cocked position;
    d. a trigger movable between a relaxed and a cocked position; the trigger including an upper crossbar and a lower crossbar; the trigger lower crossbar being in proximity to the spine, and capable of engaging the lower end of the fishing rod when the rod is received by the spine; the trigger being positioned on the holder such that as the trigger is moved between its relaxed and cocked positions, the trigger upper crossbar will engage the stake to hold the trigger and the spine in their cocked positions;
    e. a second elastic member attached to the trigger to apply a tension bias to the trigger to secure the trigger's engagement with the stake; and
    f. a pivot arm pivotally mounted near its center to the upper end of the stake, wherein the trigger is pivotally mounted on one end of the pivot arm, and the second elastic member attaches to an opposite end of the pivot arm.

wherein movement of the trigger lower crossbar caused by a tug on the fishing rod will cause the trigger upper crossbar to disengage the stake, thereby moving the trigger from its cocked to its relaxed position, and allowing the elastic member to pull the spine from its cocked position to its relaxed position.

8. The fishing rod holder as in claim 7, further comprising a cross-member attached to the stake at a position on the stake below the spine, the cross-member having a downwardly extending leg spaced from the stake.

9. The fishing rod holder as in claim 8 wherein the first elastic member attaches to the cross-member.

10. The fishing rod holder as in claim 8 further comprising a clamp which holds the stake, the clamp being releasably attachable to a variety of mounting surfaces.

11. The fishing rod holder as in claim 10, wherein the clamp comprises an upper rung and a lower rung, a screw, and a plate attached to the lower rung with a hole threaded to accommodate the screw, wherein turning the screw in one direction within the hole directs the screw toward the upper rung, and turning the screw in the opposite direction directs the screw away from the upper rung, such that the screw is thereby capable of releasably securing the clamp to a mounting surface positioned between the top of the screw and the upper rung.

12. The fishing rod holder as in claim 10, wherein the clamp receives the stake.

13. The fishing rod holder as in claim 12, wherein the clamp receives the cross-member.

14. The fishing rod holder as in claim 10 the clamp including a locking mechanism to secure the clamp to the stake.

15. The fishing rod holder as in claim 7, further comprising a cage attached to the spine, said cage capable of housing the lower end of the rod.

16. The fishing rod holder as in claim 15, wherein the cage includes a gate that is movable from an open position to facilitate placement of the lower end of the rod in the cage, to a closed position to secure said lower end of the rod in the cage.

17. The fishing rod holder as in claim 16, wherein the gate is adjustable to accommodate rods having lower ends of various shapes and sizes.

18. The fishing rod holder as in claim 17, wherein the cage includes a series of holes and the gate includes a lower leg capable of selective engagement with the holes to thereby adjust the capacity of the cage.

19. The fishing rod holder as in claim 16, wherein the cage includes a latch that secures the gate in the closed position.

20. The fishing rod holder as in claim 7, wherein the trigger includes a sleeve on the trigger lower crossbar.

21. The fishing rod holder as in claim 20, wherein the sleeve is removable from the trigger lower crossbar.

22. The fishing rod holder as in claim 20, wherein the size of the sleeve can be selectively adjusted.

23. The fishing rod holder as in claim 7, wherein the spine includes a hook, and the first elastic member attaches to the hook.

* * * * *